(No Model.) 2 Sheets—Sheet 1.

E. GROAT.
MACHINE FOR DISINTEGRATING BITUMINOUS SUBSTANCES.

No. 382,973. Patented May 15, 1888.

Witnesses:
George E. Woodbury.
John Keane

Inventor:
Elias Groat.
By Smith & Osborn
his Attorneys.

(No Model.) 2 Sheets—Sheet 2.

E. GROAT.
MACHINE FOR DISINTEGRATING BITUMINOUS SUBSTANCES.

No. 382,973. Patented May 15, 1888.

Witnesses:
George E. Woodbury.
John Keane.

Inventor:
Elias Groat.
By Smith & Osborn,
his Attorneys.

UNITED STATES PATENT OFFICE.

ELIAS GROAT, OF SAN FRANCISCO, CALIFORNIA.

MACHINE FOR DISINTEGRATING BITUMINOUS SUBSTANCES.

SPECIFICATION forming part of Letters Patent No. 382,973, dated May 15, 1888.

Application filed September 28, 1887. Serial No. 250,967. (No model.)

*To all whom it may concern:*

Be it known that I, ELIAS GROAT, a citizen of the United States, residing in the city and county of San Francisco, and State of California, have invented a new and useful Machine for Disintegrating Bituminous Substances, of which the following is a specification.

Hitherto great difficulty has been experienced in preparing bitumen-bearing rocks and bitumen-bearing sandstone in the formation of roadways and pavements, and various means have been employed for reducing the same to a plastic or a semi-plastic condition for spreading the material and causing it to unite and combine again into a homogeneous mass and form a hardened or indurated surface when laid—such, for instance, as the application of heat to the material in an open tank or kettle and the introduction of steam in a tank, closed or otherwise, for disintegration of the particles, and fitting the material for reuniting again when laid. Such treatment of the material, however, is expensive and inconvenient where a large amount of surface is to be laid; hence the object of my invention is to provide a machine for reducing or disintegrating bitumen-bearing substances—such as bituminous limestone, bituminous shale, bituminous sandstone, &c.—so that such reduced product of the machine can be employed without the use of heat in disintegration for paving streets, sidewalks, court-yards, floors, &c.

To attain this end my invention consists in an upper set or series of rollers fluted or grooved longitudinally, followed by a set of two rollers fluted or grooved circumferentially, under which latter is placed a set of rollers carrying knives, cutters, or teeth, the whole series or system being actuated by suitable gears and connections, all of which, together with the details of construction and operation, will be hereinafter fully described.

Figure 1:
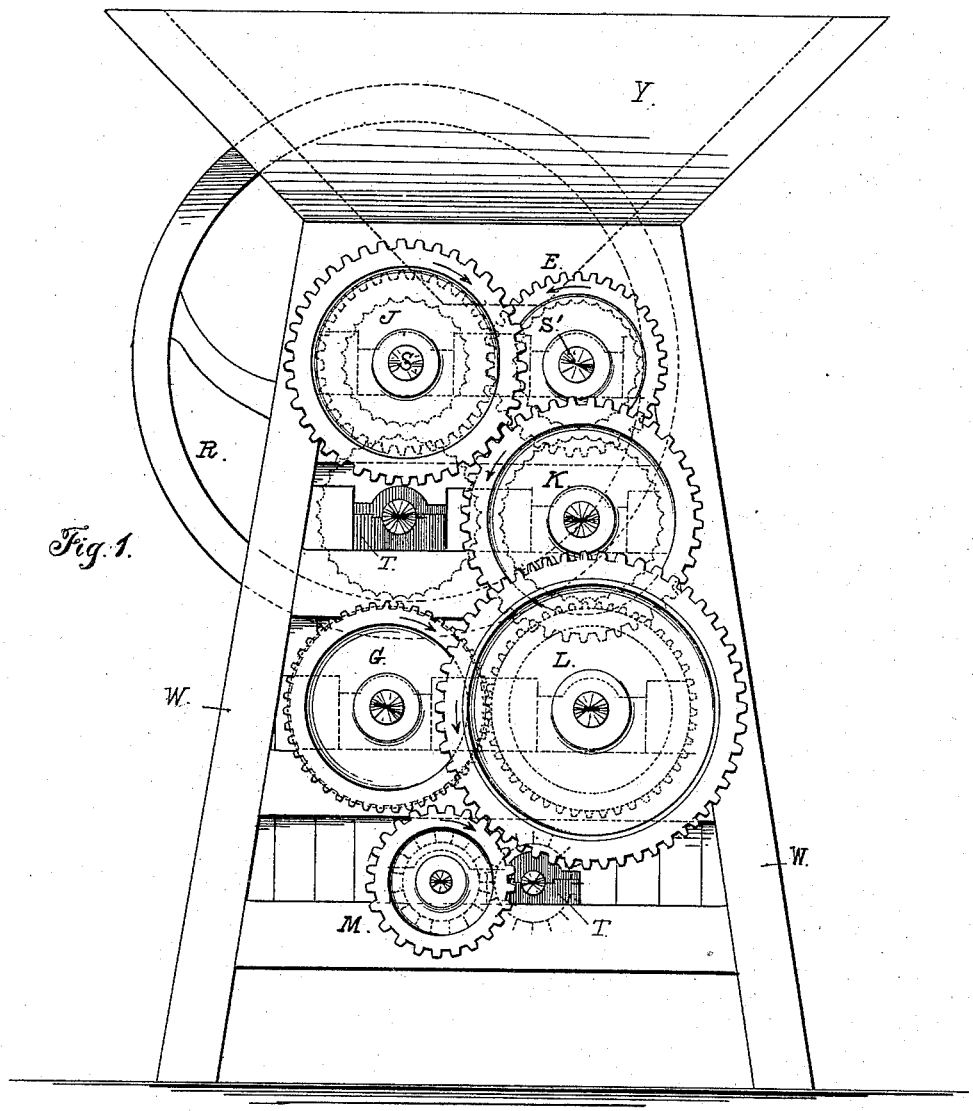
Figure 2:
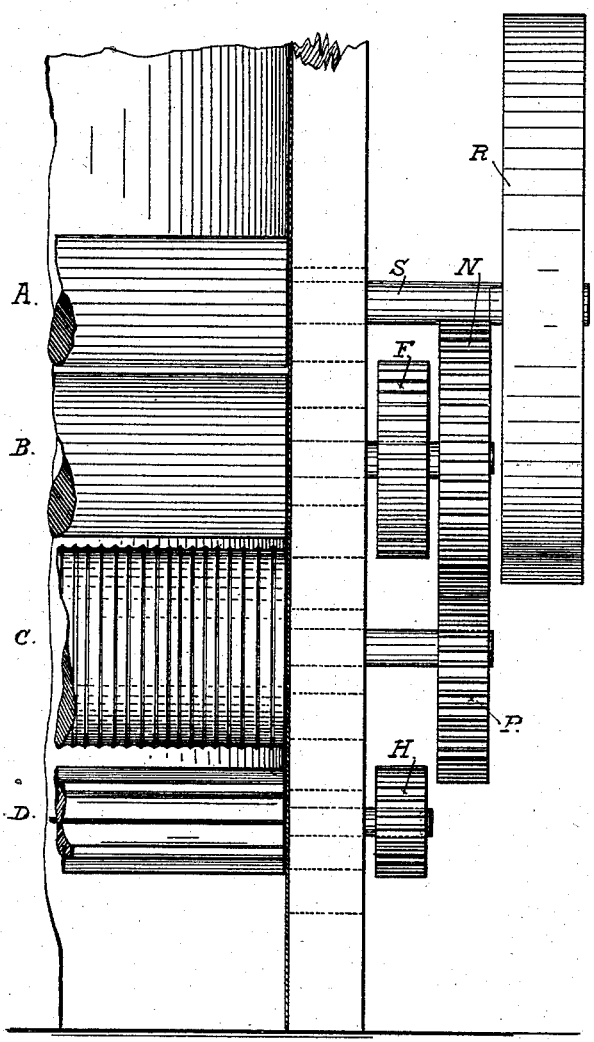
Figure 3:
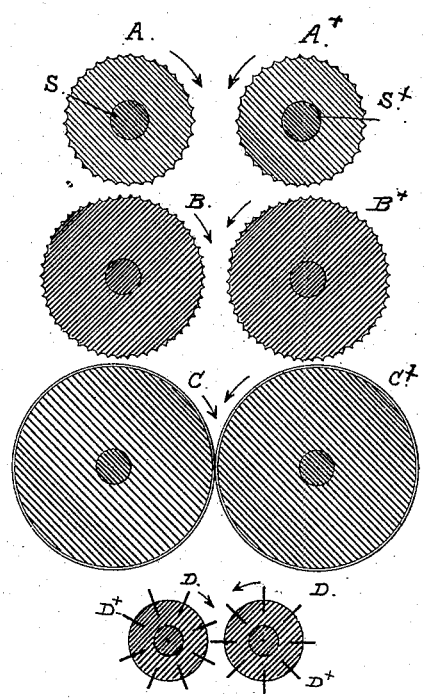

In the accompanying drawings, which form part of this specification, Figure 1 is an end view of my machine for disintegrating bituminous substances. Fig. 2 is a side view showing the arrangement of gears on the end which is opposite to that shown in Fig. 1. Fig. 3 is a cross-section through the four sets of rollers.

Similar letters refer to similar parts throughout the several views.

The rollers and operating mechanism of my machine are mounted upon a frame of suitable strength, to the top of which is connected a feeding-hopper, as shown. The two upper sets of rolls, A A$^\times$ and B B$^\times$, are fluted or grooved longitudinally from end to end, and are mounted upon the shafts S S$^\times$, carrying suitable gears, E E$^\times$, the bearings of the shafts being journaled in strongly-made boxes T T. (Shown in dotted lines upon the cross-beams of the frame.) Beneath the two sets of longitudinally fluted or grooved rolls is placed a set of two circumferentially fluted or grooved rolls, C C$^\times$, also mounted upon suitable shafts, and journaled in bearings and operated by suitably-meshing gears on the shafts. Underneath these two sets of twin longitudinally and circumferentially grooved or fluted rolls are placed the rolls D D. On these rolls are arranged at a suitable distance apart the longitudinal cutting blades or knives D$^\times$ D$^\times$, which cut the material into fragments after it has passed through the upper sets of grooved or fluted rolls, in which condition it is fit to be laid. The knives fit into longitudinal grooves made in the face of the rolls, and may be held by feathers or keys or dovetailed into the face of the rolls in such a manner as to be easily removed for sharpening, repairs, or renewal.

S is the principal driving-shaft, carrying the fly-wheel R. It drives the twin rollers A and A$^\times$ by the gears E E$^\times$, and also the second set of rollers B B$^\times$ through the medium of the meshing gears J K.

The third or circumferentially-fluted set of rollers C and C$^\times$ is driven from the second set, B B$^\times$, by the meshing gears N P. (Shown in side view in Fig. 2.)

Motion is transmitted to the fourth set of rollers D and D, carrying the knives or blades D$^\times$ D$^\times$, by the meshing gears L M from the third set of rollers C C$^\times$, and thus the whole train of gears and their rollers are kept in motion in the direction as indicated by the arrows, Fig. 3.

The journal boxes or bearings of the circumferentially-fluted rolls are made adjustable and provided with keys or wedges, so that the rollers can be set nearer together or farther apart, as desired.

In practice the material is fed to the machine through the medium of the hopper Y, and, falling into the upper set of fluted rolls, it is crushed or broken up into fragments. These rolls are set or geared wider apart than the second set of rolls beneath, the office of the latter set being to crush the material from the upper set into still finer fragments, while the set of circumferentially grooved or fluted rolls are set or geared quite close together, the object being to gradually break up and loosen the cohesion of the material by the two upper sets of fluted rolls differing in amount of crushing force, and so prepare the material that it will pass through the circumferential grooves or flutes of the closely-geared rolls beneath in a loosely-granulated and stringy form to be engaged by the cutters $D^\times$ of the lower rolls, D D, and divided into fragments suitable for laying or spreading upon the street or roadway in a cold state or condition, and when so laid a hot or cold roller is passed over the material, which soon causes the particles to become reunited into a solid mass with a greatly hardened or indurated surface. By this means it will be seen that large quantities of the natural product can be rapidly reduced and fitted for laying in a short space of time and at very small cost, enabling me to construct roadways, &c., at a much less price than is possible where the substance is to be first reduced by heat or steam.

Having thus described my invention, what I claim, and desire to secure by Letters Patent, is—

1. In a machine for disintegrating and reducing bituminous substances, the combination, with the supporting-frame, of the two sets of upper rollers fluted longitudinally and mounted upon shafts journaled in the frame, the two circumferentially-fluted rollers, whose shafts are journaled in the frame beneath the upper rollers, the two knife-carrying rollers located beneath the circumferentially-fluted rollers, and suitable gearing for connecting and actuating these rollers, all substantially as described.

2. The combination of the supporting-frame, the set of longitudinally-fluted rollers $A\ A^\times$, mounted on shafts $S\ S^\times$, carrying gears $E\ E^\times$, and said shaft S carrying fly-wheel R, the set of longitudinally-fluted rollers $B\ B^\times$, gears J K for actuating them, the set of circumferentially-fluted rollers $C\ C^\times$, and gears N P for actuating them, and the rollers D D, carrying knives $D^\times$ and driven by meshing gears L M, all arranged substantially as described.

In testimony that I claim the foregoing I have hereunto set my hand and seal.

ELIAS GROAT. [L. S.]

Witnesses:
C. W. M. SMITH,
LEE D. CRAIG.